June 29, 1971

V. A. CORSARO 3,588,998

METHOD FOR TREATING ARTICLES WITH A LIQUID

Filed July 16, 1968

INVENTOR
V. A. CORSARO

By

ATTORNEY

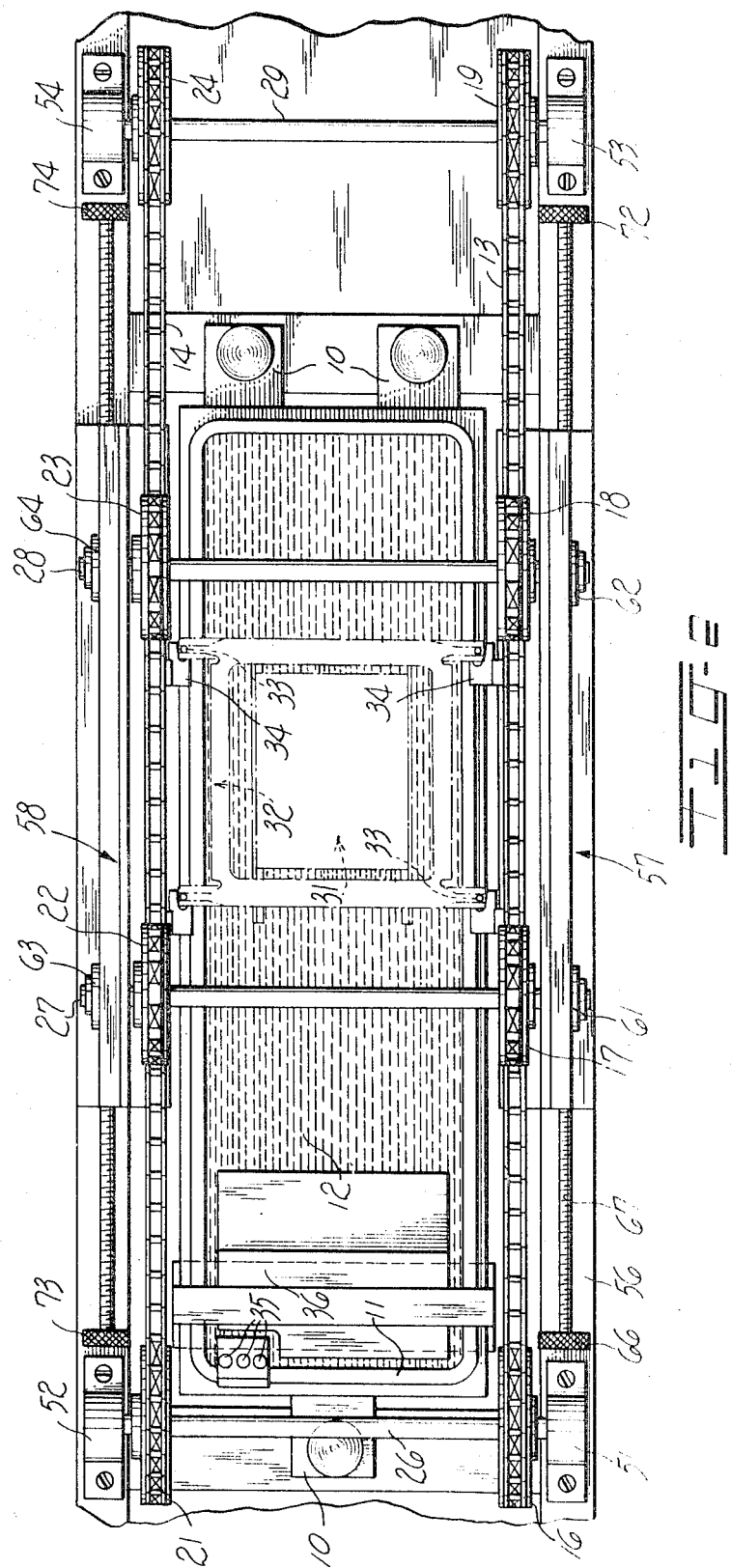

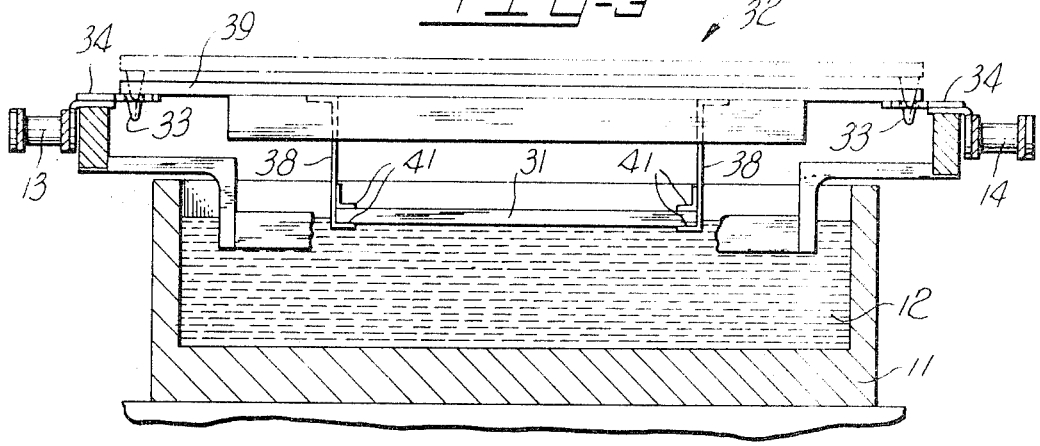
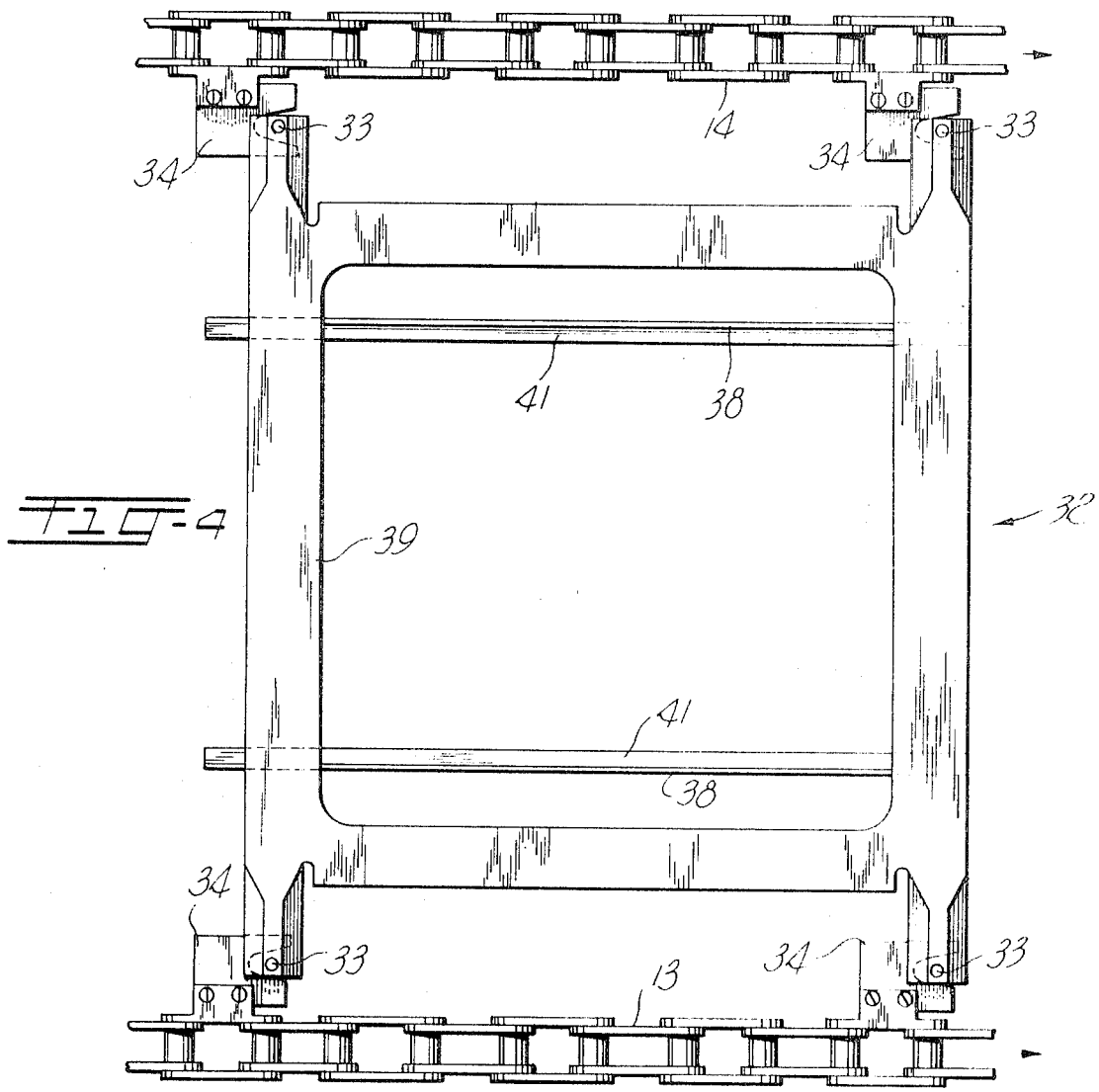

United States Patent Office 3,588,998
Patented June 29, 1971

3,588,998
METHOD FOR TREATING ARTICLES WITH A LIQUID
Vincent A. Corsaro, Haverhill, Mass., assignor to Western Electric Company, Incorporated, New York, N.Y.
Filed July 16, 1968, Ser. No. 745,253
Int. Cl. B23k 31/02
U.S. Cl. 29—471.1                                              7 Claims

ABSTRACT OF THE DISCLOSURE

A drag line soldering apparatus includes two chains moving over sprocket wheels and mounting a succession of masked circuit boards in article carriers for floatation upon the top surface of molten solder in a tank. Adjustment of the position of certain of the sprocket wheels selects a critical angle of withdrawal of the boards from contact with the molten solder, eliminating substantially all formation of "icicles" of solidified solder. Adjustment of the position of others of the sprocket wheels selects a desired angle of contact and a desired length of contact path between the boards and the top surface of the molten solder.

---

This is the parent of divisional application Ser. No. 66,049, filed Aug. 21, 1970.

BACKGROUND OF THE INVENTION

This invention relates to methods for treating an article with a liquid, such as molten solder, and, more particularly, to methods for soldering a succession of articles advanced into contact with molten solder and subsequently out of contact with the solder through the use of moving drag lines or chains supporting the articles.

It is known to utilize moving drag lines or chains to advance a succession of articles, e.g., circuit boards, into contact with molten solder in a tank. The articles, after contacting the molten solder and undergoing a soldering operation, are withdrawn by the moving chains from the solder tank.

In soldering articles using known drag line soldering apparatus, it is common to experience the formation of "icicles," i.e., undesirable projections from an article formed through the solidification of excess quantities of molten solder which adhere to the article as the article is brought out of contact with the solder in the tank. Such "icicles" tend to cause short-circuiting of electrically conductive circuit paths on the article or other objectionable characteristics. It is desirable that methods be provided for eliminating, to a substantial extent, the formation of "icicles" on articles treated with solder in drag line soldering systems.

SUMMARY OF THE INVENTION

An object of the invention resides in new and improved methods for treating an article or articles with liquid in a bath, such as molten solder contained in a solder tank.

The invention contemplates the use of drag line soldering apparatus for treating with solder successively advanced articles, the articles being mounted on moving chains in such manner that the articles float across the top surface of the solder with movement of the chains. The articles are then withdrawn successively from contact with the solder at a selected angle to the top surface of the solder. It has been determined that a critical angle of withdrawal or exit angle exists for any particular type of article such that the formation of "icicles" is eliminated to a substantial extent.

Mechanisms are provided in the apparatus for adjusting the exit angle continuously through an infinite number of incrementally spaced positions to fix precisely the selected angle for each particular type of article to be soldered. Similar mechanisms are provided for adjusting the angle at which each article contacts the molten solder in order to float across the top surface of the solder with movement of the drag lines or chains. Such adjustment will enable the article to engage the solder without plowing and will regulate the length of the contact path between the floating article and the solder, once the exit angle has been fixed.

Additionally, in order to shield certain portions of the articles, e.g., portions of circuit boards, from contact with the molten solder, masks are used. The masks and the articles are assembled in overlapping relationship with windows in the masks exposing only selected portions of the articles to be treated with solder. Article carriers, mounted on the advancing chains, maintain this overlapping relationship during the soldering operation, so that only the selected, exposed portions of the floating articles contact the molten solder.

BRIEF DESCRIPTION OF THE DRAWING

FIG. 1 is a side elevational view illustrating portions of a drag line soldering apparatus constructed in accordance with the principles of the invention for applying solder to articles advanced successively into contact with the solder to float on a top surface thereof;

FIG. 2 is a top view showing the soldering apparatus of FIG. 1 including a pair of chain conveyers for advancing article carriers across a solder tank, several sprocket wheels engaging the chain and several sprocket wheel position adjusting mechanisms;

FIG. 3 is an end elevational view of one of the article carriers supported on the chains;

FIG. 4 is a top view further illustrating the article carrier of FIG. 3; and

DETAILED DESCRIPTION

Figure 5:
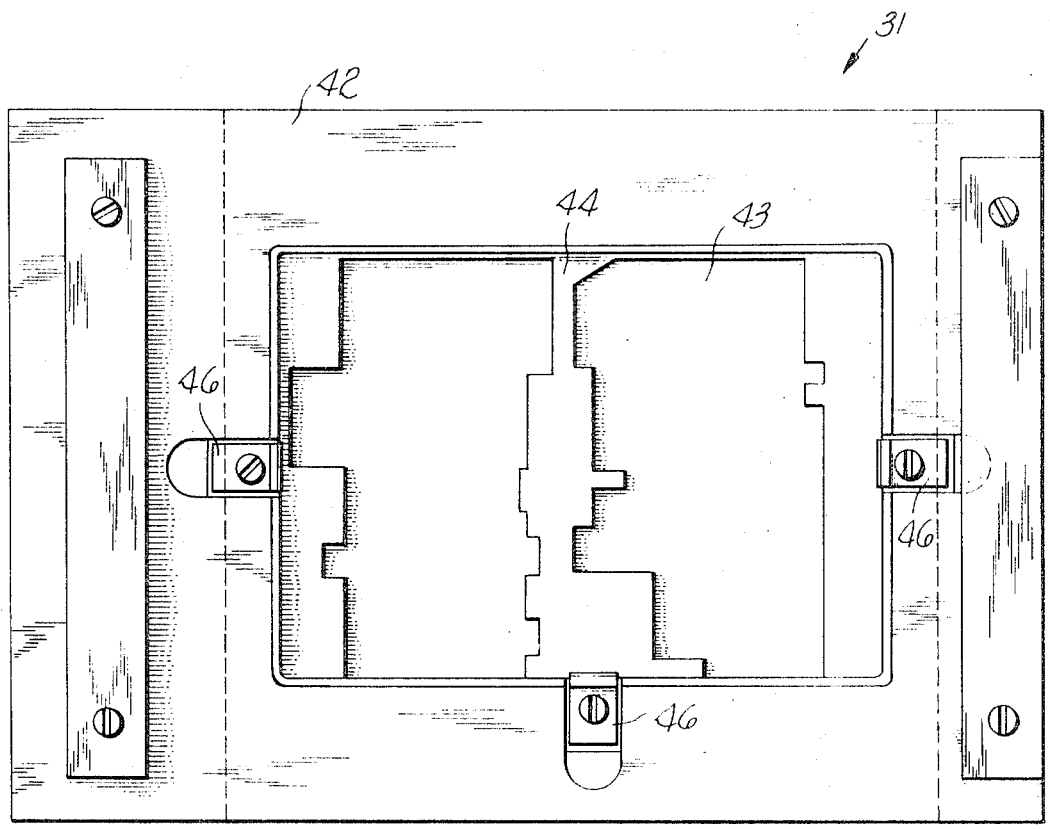
FIG. 5 is a top view of an assembly which may be placed in the article carrier of FIGS. 3 and 4 for soldering by the apparatus of FIGS. 1 and 2, the assembly including a printed circuit board or similar article and a mask, which are held in overlapping relationship by a board retaining plate.

Referring first to FIGS. 1 and 2, portions of a drag line soldering apparatus are illustrated. The apparatus includes a heated solder pot or tank 11 which is partially filled with molten solder 12. The tank is mounted on a number of height-adjustable supports 10. A pair of drag line conveyers or endless chains 13 and 14 extend longitudinally of the solder tank 11, one at each side of the tank. The conveyer chain 13 engages several sprocket wheels 16, 17, 18, 19, which define a path of movement for the chain 13. The conveyer chain 14 engages several other sprocket wheels 21, 22, 23, 24, which define a parallel path of movement for the chain 14. The chains 13 and 14 are suspended arcuately from top portions of the sprocket wheels 16 and 19, 21 and 24, respectively. Chains 13 and 14 engage bottom portions of the sprocket wheels 17 and 18, 22 and 23, respectively.

The sprocket wheels 16 and 21 are both mounted on a sprocket wheel shaft 26 extending over the top of the solder tank 11. Each of several other sprocket wheel shafts 27, 28, 29, extending over the top of the solder tank 11, mounts a similar pair of sprocket wheels, i.e., sprocket wheels 17 and 22, 18 and 23, and 19 and 24, respectively. The sprocket wheel shaft 29 may be rotated by a conventional motor 30 (FIG. 1) and drive train to advance the chains 13 and 14 across the associated sprocket wheels.

Turning now to FIGS. 3 through 5, a succession of articles or assemblies 31 are to be soldered by the apparatus. Each assembly 31 is mounted on a generally rectangular article carrier 32 which may be supported to depend from the advancing conveyor chains 13 and 14. The article carrier 32 has four downwardly extending pins 33, one located at each corner of the article carrier. The pins 33 are to be carried by pickup and supporting links 34 extending laterally from the chains 13 and 14 such that the article carriers are freely movable vertically with respect to the chains. This freedom of vertical movement, which may be seen by comparing the solid and phantom line position of FIG. 3, will permit the article carriers 32 with the assemblies 31 to float upon the top surface of the solder 12 as the chains 13 and 14 drag the article carriers, by the pins 33, across the solder tank 11.

A solder level control system includes several level sensing probes 35 and a displacement block 36 (FIGS. 1 and 2). The displacement block is adjustably positionable vertically in the tank 11 by a motor 37 in response to signals from the probes to regulate the level of solder in the tank between predetermined working limits. This solder level control system will allow the assemblies 31 to float on the top surface of the solder 12 with the pins 33 not escaping from the links of the chains 13 and 14. The solder level control system and article preheating facilities are disclosed more fully in a copending application (Ser. No. 745,254, on a Level Control System for Fluent Material, of V. A. Corsaro and N. F. Smith, filed concurrently with the instant application.

A pair of brackets 38, 38 extend downwardly from a top plate 39 of each article carrier. The brackets each include a pair of longitudinally extending tangs 41 shaped to form ways for each retaining one edge of an assembly 31 therebetween. The assembly may be inserted endwise into the ways formed in the article carrier between the tangs 41.

A typical assembly 31 is shown in FIG. 5. The assembly 31 includes a retaining plate 42, a printed circuit board 43 or other article, and a mask 44. The mask 44 is shaped so as to shield certain portions of the board 43 or article from contact with the molten solder 12 while other, exposed, portions of the circuit board contact, and are treated by, the solder in the tank 11. The mask and the circuit board may be assembled in overlapping contact and then inserted into the retaining plate 42. Several spring clips 46 are positioned on the retaining plate to contact the mask 44 and hold both the circuit board 43 and the mask in the retaining plate. The mask 44 faces downwardly in the retaining plate 42 so that only the desired portions of the circuit board 43 will be exposed to the solder through windows in the mask. Alternatively, the mask may be integral with the retaining plate 42 or, if desired, the assembly 31 may be a single, unmasked article which is to be soldered by the apparatus. A number of wipers (not shown) may be suspended from the chains 13 and 14, for example, one preceding each assembly 31, to remove dross from the molten solder 12 in the tank 11.

The sprocket wheel shafts 26 and 29 (FIGS. 1 and 2) are fixed against longitudinal movement by bearings 51, 52 and 53, 54, respectively, which support the shafts on a frame member 56 of the apparatus. The sprocket wheel shafts 27 and 28, however, are longitudinally movable in order that the longitudinal position of the sprocket wheels 17, 22 and 18, 23 may be adjusted to define various paths of movement for the conveyer chains 13 and 14.

A pair of trackways 57 and 58 extend longitudinally, one at each side of the solder tank 11. Two bearing blocks 61 and 62 are slideably mounted in the trackway 57. Two similar bearing blocks 63 and 64 are slidably mounted in the trackway 58. The sprocket wheel shaft 27 is mounted in the longitudinally movable bearing blocks 61 and 63, while the sprocket wheel shaft 28 is mounted in the longitudinally movable bearing blocks 63 and 64.

A knurled knob 66 and an adjustment rod 67, on one end of which the knob is mounted, are associated with the bearing block 61. The other end of the rod 67 is mounted to a collar 68 (FIG. 1) on the bearing block 61, being free to rotate in the collar. A threaded portion of the rod is engaged with a fixed, internally threaded block 69. Manual rotation of the knob 66 will adjust the longitudinal position of the bearing block 61 along the trackway 57, as desired. Such adjustment will occur as the threaded rod 67 moves axially within the fixed, threaded block 69 and displaces the collar 68 of the bearing block axially. Similar bearing block adjusting mechanisms are associated with the bearing blocks 62, 63 and 64, the respective knurled adjusting knobs being identified by reference numerals 72, 73 and 74.

In preparing the soldering apparatus for operation, the adjusting knobs 66, 72, 73 and 74 are used initially to set the bearing blocks 61, 62, 63 and 64 at desired positions. This fixes the positions of the sprocket wheel shafts 27 and 28 and, thus, of the sprocket wheels 17 and 22, 18 and 23, respectively, which define the paths of movement of the conveyer chains 13 and 14. Since the locations of the sprocket wheels 16 and 21 are fixed by the nondisplaceable sprocket shaft 26, the selected position of the sprocket wheels 17 and 22 will determine the angle A with the horizontal which will be assumed by the linear sections of the chains 13 and 14 located between the sprocket wheels 16 and 17, 21 and 22, respectively. This will determine the attitude of the assemblies 31 during their approach and entry into the solder tank 11 to contact the molten solder 12 and the position at which the first contact occurs. Likewise, since the locations of the sprocket wheels 19 and 24 are fixed by the nondisplaceable sprocket shaft 29, the selected position of the sprocket wheels 18 and 23 will determine the angle B with the horizontal which will be assumed by the linear sections of the chains 13 and 14 located between the sprocket wheels 18 and 19, 23 and 24, respectively. This will determine the attitude of the assemblies 31 as they are withdrawn from contact with the top surface of the molten solder 12 to exit from the solder tank 11 and the position of withdrawal from contact. Sufficient slack may be allowed in the chains 13 and 14 to permit the adjustments in the positions of the sprocket wheels 17, 18, 22 and 23. Alternatively, suitable slack adjustment or tensioning mechanisms may be utilized.

The use of the adjusting knobs 66, 72, 73 and 74, plus the associated shafts, collars and fixed and movable blocks, allows precise initial regulation of the entry or contact angle A and the withdrawal or exit angle B, as well as of the contact and withdrawal positions. The precision of adjustment is particularly significant with respect to the exit angle B, as it has been found that the angle at which the circuit board 43 or other article is withdrawn from the molten solder is critical for each particular type of circuit board or article used. This criticality concerns prevention of the formation of "icicles," i.e., excess quantities of molten solder which adhere to the circuit board or article and which subsequently solidify into undesirable projections. Such projecting elements of solidified solder may cause short-circuiting of the circuit paths on the board or other objectionable characteristics. An exit angle B of about eleven to fifteen degrees with the horizontal top surface of the molten solder 12 has been found to eliminate to a substantial extent the formation of "icicles" in various types of printed circuit boards tested. An exit angle B of about twenty degrees with the horizontal top surface of the molten solder 12 has been found to eliminate to a substantial extent the formation of "icicles" in certain types of thin film circuits tested. The variation of the critical exit angle B for different types of articles tested is believed to reside in the different sizes, surface configurations and materials of the various articles. It should be noted that, for any particular article to be soldered, the adjusting knobs 72 and 74 may be manipulated through a continuous range of incrementally spaced positions to select precisely the correct exit angle B for the article.

Similar adjustment of the contact angle A is afforded by manipulation of the adjusting knobs 66 and 73, which regulate the longitudinal position of the sprocket shaft 27. The sprocket wheel shaft 27 is preferably positioned after the exit angle B has been set. The angle A is selected to contact each assembly 31 with the molten solder 12 sufficiently gently to avoid any plowing of the assembly into the solder. The position of the sprocket wheel shaft 27, moreover, determines the length of the contact path between the assembly 31 and the solder, once the position of the sprocket wheel shaft 28 and the exit angle B have been fixed. The length of the contact path may be selected to govern, for example, the amount of heat to be absorbed by a given article advanced across the solder by the chains 13 and 14 at any given velocity.

With the desired positions of the sprocket wheel shafts 27 and 28 and the desired angles A and B set by manipulation of the various adjusting knobs, the motor 30 is energized through the closing of a switch (not shown) by the operator. The sprocket wheel shaft 29 begins to rotate in a clockwise sense, as seen in FIG. 1, rotating the sprocket wheels 19 and 24 to advance the conveyer chains 13 and 14, respectively. The other sprocket wheels 16, 17, 18 and 21, 22, 23 function as idlers to define the paths of movement for the respective chains 13 and 14.

The article carriers 32, each supporting an assembly 31 which includes a printed circuit board 43 (FIG. 5) or other article and an overlapping mask 44 in a retaining plate 42, are now introduced successively onto the chains 13 and 14. The article carriers 32 may be placed manually onto the chains, but are preferably fed by conventional automatic mechanisms into position to be received by the suitably shaped pickup links 34 extending laterally from the chains. The chains advance the article carriers linearly successively past the fixed sprocket wheels 16 and 21, along the entrance or contact angle A, and past the adjustable sprocket wheels 17 and 22 into contact with the molten solder 12 in the tank 11. The article carriers 32 float on the top surface of the molten solder with the masks 44 and the exposed portions of the circuit boards 43 contacting the solder. The exposed portions of each circuit board undergo a soldering operation as the chains 13 and 14 advance the associated article carrier 32 linearly toward the adjustable sprocket wheels 18 and 23. Floatation occurs with the pins 33 still engaging the links 34 extending laterally from the chains 13 and 14, due to the operation of the solder level control system provided by the aforementioned copending application, Ser. No. 745,254.

The chains next advance the article carriers 32 successively past the adjustable sprocket wheels 18 and 23 and withdraw the article carriers and the circuit boards 43 from the top surface of the molten solder linearly at the exit angle B. Each article carrier continues to advance with the moving chains 13 and 14 past the fixed sprocket wheels 19 and 24, whereupon the article carrier may be removed from the chains either manually or by suitable automatic unloading mechanisms. The assemblies 31 may be removed from the unloaded article carriers 32 and the finished circuit boards 43 may then be removed from the retaining plates 42 and disengaged from the masks 44. The apparatus will continue to function in the described manner to solder successively a multiplicity of the assemblies 31.

Briefly reviewing the method of soldering one or more articles in accordance with the principles of the invention, an article or a succession of articles is to be treated with molten solder 12. Each article may be prepared for treatment of selected portions only by the preliminary step of engaging with the article, e.g., the printed circuit board 43, a mask 44 having windows exposing only the selected portions of the article.

An appropriate angle B of withdrawal of the article from floating contact with the solder is selected initially, the angle typically being one of from about eleven degrees to about fifteen degrees for a printed circuit board, such that "icicle" formation will be substantially avoided. A withdrawal angle adjustment mechanism, e.g., the knobs 72 and 74, may be operated to provide the selection.

The method involves initially floating the article on the top surface of the molten solder 12 so that the mask 44 and the exposed portions of the circuit board 43 contact the molten solder to be treated thereby.

A linear movement is imparted to the article across the top surface of the molten solder as the contact continues.

The article is subsequently withdrawn from floating contact with the top surface of the solder 12 at the selected angle B of withdrawal. Thus, the circuit board 43 and the mask 44 are removed from the solder together.

Finally, the mask and circuit board may be disengaged.

It is to be understood that the above-described method is simply illustrative of one embodiment of the invention. Another embodiment incorporating the principles of the invention might mount the outermost sprocket wheels 16, 19, 21 and 24 for adjustable positioning. Many other modifications may be made without departing from the invention.

What is claimed is:

1. In a method of treating an article with molten solder in a single solder bath, the steps of:
   introducing the article onto the top surface of the molten solder in the single solder bath at an angle of entry adjusted to engage the article with said top surface without plowing a leading section of the article into the solder;
   imparting to the article a linear floating movement along said top surface of the molten solder in the single solder bath; and then
   withdrawing the article from floating contact with the top surface of the solder in the single solder bath at an angle of withdrawal adjusted independently of the adjustment of said angle of entry to eliminate substantially all formation of solidified elements of excess solder projecting from the article after treatment in the single solder bath.

2. In a method of treating an article with molten solder in a single solder bath, as set forth in claim 1, utilizing a suspended conveyor for moving the article;
   engaging the suspended conveyor at two spaced points to advance the article along a path of movement; and
   moving the two points of engagement selectively along a path generally parallel to the top surface of the solder to vary independently said angles of entry and withdrawal of the article onto and from the top surface of the solder in the bath while varying the distance of movement of the article in continuous contact with the top surface of the solder.

3. In a method of treating an article with molten solder in a single solder bath, as set forth in claim 1, the article being a circuit board, the withdrawing step comprising:
   withdrawing the circuit board at an angle of withdrawal of from about eleven degrees to about fifteen degrees to the top surface of the molten solder.

4. In a method of treating an article with molten solder in a single solder bath, as set forth in claim 1, the article being a thin film circuit, the withdrawing step comprising:
   withdrawing the circuit at an angle of withdrawal of about twenty degrees to the top surface of the molten solder.

5. In a method of treating selected portions of an article with molten solder in a single solder bath, the steps of:
   engaging with the article a mask having at least one window exposing only the selected portions of the article; next
   introducing the article and the mask onto the top surface of the molten solder in the single solder bath at an angle of entry adjusted to engage the mask and the exposed portions of the article with said top surface without plowing a leading section of the article into the solder; then floating the mask and the exposed portions of the article across the top surface of the molten solder; then withdrawing the mask and the exposed portions of the article from contact with the solder along an angle of withdrawal adjusted independently of the adjustment of said angle of entry to eliminate substantially all formation of solidified elements of solder projecting from the exposed portions of the article and tending to prevent disengagement of the mask from the article; and thereafter disengaging the mask from the article.

6. In a method of treating selected portions of an article, as set forth in claim 5, utilizing a suspended conveyor for moving the article and the mask;

engaging the suspended conveyor at two spaced points to advance the article along a path of movement; and moving the two points of engagement selectively along a path generally parallel to the top surface of the solder to vary independently said angles of entry and withdrawal.

7. In a method of treating an article with molten solder in a solder bath while advancing the article across the top surface of the solder in the bath on a longitudinally movable conveyor depending from two fixed suspension points spaced longitudinally of the solder bath, the steps of:

engaging the conveyor at two spaced points intermediate the two fixed suspension points; then adjusting by longitudinal movement a first of said engagement points to establish a predetermined angle of withdrawal of the article out of contact with the top surface of the solder in the bath toward a first of the fixed suspension points closer to said first engagement point; next adjusting by longitudinal movement the second of said engagement points to establish a predetermined longitudinal position of initial contact of the article with the top surface of the solder in the bath upon advancing from the second of the fixed suspension points closer to said second engagement point; and then moving the conveyor in a direction from said second fixed suspension point toward said second engagement point, then toward said first engagement point and then toward said first fixed suspension point to advance the article first into contact with the top surface of the molten solder in the solder bath at said predetermined position of initial contact, then to advance the article along the top surface of the solder in the bath and then to withdraw the article out of contact with the top surface of the solder in the bath at said predetermined angle of withdrawal.

References Cited

UNITED STATES PATENTS

| 2,740,193 | 4/1956 | Pessel | 29—487 |
| 3,039,185 | 6/1962 | Oates | 228—37X |
| 3,053,215 | 9/1962 | Guty | 228—39X |
| 3,386,166 | 6/1968 | Tardoskegyi | 29—471.1X |
| 3,407,984 | 10/1968 | Walker | 29—471.1X |
| 3,439,854 | 4/1969 | Walker | 29—471.1X |

JOHN F. CAMPBELL, Primary Examiner

R. B. LAZARUS, Assistant Examiner

U.S. Cl. X.R.

29—487, 493, 503

Disclaimer 3,588,998.—*Vincent A. Corsaro*, Haverhill, Mass. METHOD FOR TREATING ARTICES WITH A LIQUID. Patent dated June 29, 1971. Disclaimer filed Feb. 22, 1974, by the assignee, *Western Electric Company, Incorporated*.

Hereby enters this disclaimer to all claims of said patent.

[*Official Gazette August 27, 1974.*]